US012561687B2

(12) United States Patent (10) Patent No.: US 12,561,687 B2

Galiamov et al. (45) Date of Patent: Feb. 24, 2026

(54) DECENTRALIZED DIGITAL IDENTITY EXCHANGE FOR FRAUD DETECTION

(71) Applicant: International Business Machines Corporation, Armonk, NY (US)

(72) Inventors: Anthony Galiamov, Olinda (AU); David Moore, Carrara (AU)

(73) Assignee: International Business Machines Corporation, Armonk, NY (US)

( * ) Notice: Subject to any disclaimer, the term of this patent is extended or adjusted under 35 U.S.C. 154(b) by 20 days.

(21) Appl. No.: 18/587,620

(22) Filed: Feb. 26, 2024

(65) Prior Publication Data

US 2025/0272688 A1 Aug. 28, 2025

(51) Int. Cl.
 G06Q 20/40 (2012.01)
 G06Q 20/36 (2012.01)
(52) U.S. Cl.
 CPC ..... G06Q 20/4016 (2013.01); G06Q 20/3674 (2013.01); G06Q 20/40145 (2013.01)
(58) Field of Classification Search
 CPC ........... G06Q 20/4016; G06Q 20/3674; G06Q 20/40145
 See application file for complete search history.

(56) References Cited

U.S. PATENT DOCUMENTS

| | | | |
|---|---|---|---|
| 10,756,906 B2 | 8/2020 | Toth | |
| 11,018,869 B2 | 5/2021 | Sundaresan et al. | |

| | | | | |
|---|---|---|---|---|
| 2018/0091505 | A1* | 3/2018 | Farrell | ................. H04L 63/062 |
| 2020/0220726 | A1 | 7/2020 | Lougheed, III et al. | |
| 2020/0403810 | A1* | 12/2020 | Murdoch | ............... H04L 67/10 |
| 2021/0089635 | A1 | 3/2021 | Weeresinghe | |
| 2021/0365544 | A1* | 11/2021 | Malin | .................. H04L 9/0819 |
| 2023/0254311 | A1* | 8/2023 | Huffman | ............. H04L 63/0861 726/4 |
| 2023/0319039 | A1* | 10/2023 | Murdoch | ............. G06F 21/335 726/9 |
| 2024/0054482 | A1* | 2/2024 | Sonsurkar | ........ G06Q 20/40145 |

(Continued)

OTHER PUBLICATIONS

"Jumio Collaborates with Microsoft to Deliver on its Vision of Decentralized Digital Identity", https://www.jumio.com/about/press-releases/microsoft-decentralized-identity/, Apr. 5, 2021, 4 pages.

(Continued)

*Primary Examiner* — Eric T Wong

(74) *Attorney, Agent, or Firm* — CANTOR COLBURN LLP; Anthony Mauricio Pallone

(57) ABSTRACT

A decentralized digital identity exchange (IDX) is provided. In response to receiving a request for identity verification of a user, the IDX transmits, to a digital wallet associated with the user, a request for current biometric data. The current biometric data is received from the digital wallet and a biometric liveness check is performed. In response to the biometric liveness check succeeding, the IDX generates a verification transaction ID (VTID) and a verifiable credential for the user. The VTID is a unique identifier that comprises a representation of when the identity of the user was verified by the IDX. The verifiable credential and VTID are transmitted to the digital wallet which sends them to a relying party computing system to verify the identity of the user to the relying party computing system.

18 Claims, 10 Drawing Sheets

(56) References Cited

U.S. PATENT DOCUMENTS

| | | | |
|---|---|---|---|
| 2024/0185191 A1* | 6/2024 | Bernardi | H04L 9/50 |
| 2025/0054087 A1* | 2/2025 | Schwartz | G06Q 50/265 |

OTHER PUBLICATIONS

"Verifying Verifiable Credentials", https://docs.centre.io/verite/patterns/verification-flow, downloaded from the internet on Oct. 10, 2023, 11 pages.

Gunasinghe, H. et al., "PrivIdEx: Privacy Preserving and Secure Exchange of Digital Identity Assets", WWW '19: The World Wide Web Conference, San Francisco CA USA, May 13-17, 2019, 11 pages.

Kawasaki, "Fujitsu Develops Digital Identity Technology to Evaluate Trustworthiness in Online Transactions", https://www.fujitsu.com/global/about/resources/news/press-releases/2019/0704-01.html, Jul. 4, 2019, 6 pages.

* cited by examiner

100

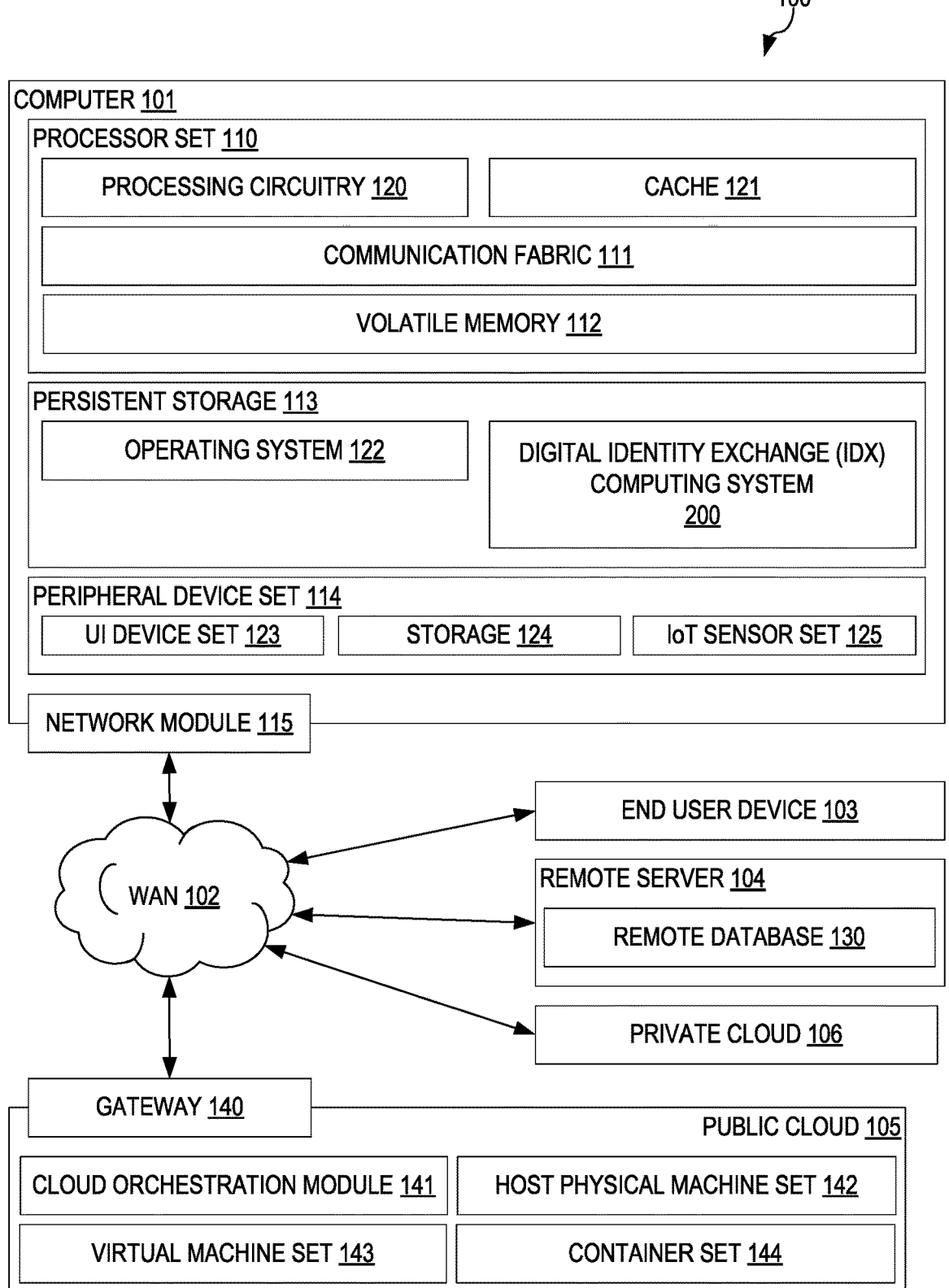

COMPUTER 101

PROCESSOR SET 110

PROCESSING CIRCUITRY 120     CACHE 121

COMMUNICATION FABRIC 111

VOLATILE MEMORY 112

PERSISTENT STORAGE 113

OPERATING SYSTEM 122     DIGITAL IDENTITY EXCHANGE (IDX) COMPUTING SYSTEM 200

PERIPHERAL DEVICE SET 114

UI DEVICE SET 123     STORAGE 124     IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141     HOST PHYSICAL MACHINE SET 142

VIRTUAL MACHINE SET 143     CONTAINER SET 144

*FIG. 1*

BEGIN

DETECT/GET NOTIFICATION OF
FRAUD EVENT 510

IDENTIFY VTIDS AFFECTED BY
FRAUD EVENT 520

BROADCAST NOTIFICATION
SPECIFYING VTIDS AFFECTED BY
FRAUD EVENT 530

PARTIES PERFORM VTID CHECKS
WITH LOCALLY STORED VTIDS 540

PARTIES DETECTING MATCHING
VTIDS INITIATE FRAUD MITIGATION
OPERATIONS 550

END

DECENTRALIZED DIGITAL IDENTITY EXCHANGE FOR FRAUD DETECTION

BACKGROUND

The present application relates generally to an improved data processing apparatus and method and more specifically to an improved computing tool and improved computing tool operations/functionality for decentralized digital identity exchange for fraud detection.

Fraud and identity theft are rampant in modern society with the advent of computer networks and digitization of traditional forms of identity. Fraudsters may often gain access to a person's personal identity information and adopt the identity to obtain unauthorized access and benefits that should only be provided to the actual person whose identity was stolen. In some cases, fraudsters may generate their own identities that appear to be legitimate and obtain access and benefits based on their concocted identity.

Governments and organizations of the world perform many critical functions and provide service delivery for their citizens. Various government programs have been established to assist citizens in various ways by providing services that the legitimate citizens may access and benefit from. One example of the most critical and expensive of these government services is the provision of welfare to eligible recipients. Unfortunately, the delivery of such welfare is often abused and defrauded by those seeking to claim excessive benefits. Other government programs that are often the target of fraudsters include COVID relief programs for employers, government provided healthcare programs, e.g., Medicaid/Medicare, emergency relief programs, such as available from the Federal Emergency Management Agency (FEMA), and the like.

A common vector of attack is misrepresentation of, or plain fraudulent claims of identity. In some cases "stolen identity" documentation and claims are used by fraudsters to access the resources and benefits of a service. In other cases, a single individual may create multiple government identities in order to receive multiple instances benefits, e.g., welfare benefits for a plurality of identities. Thus, it is clear that fraud is a significant problem that should be addressed.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system specifically configured to provide a decentralized digital identity exchange (IDX), is provided. The method comprises receiving, from a relying party computing system, a request for identity verification of a user requesting access to one of data, resources, or services of the relying party. The method further comprises transmitting, by the IDX of the data processing system, to a digital wallet associated with the user, a request for current biometric data of the user. Moreover, the method comprises receiving, from the digital wallet, the current biometric data and performing a biometric liveness check on the current biometric data based on previously stored biometric data. Furthermore, the method comprises, in response to the biometric liveness check indicating the current biometric data matches the previous stored biometric data, generating a verification transaction ID (VTID) and a verifiable credential for the user. The VTID is a unique identifier that comprises a representation of when the identity of the user was verified by the IDX. In addition, the method comprises transmitting the verifiable credential and VTID to the digital wallet. The digital wallet sends the verifiable credential and VTID to the relying party computing system to verify the identity of the user to the relying party computing system.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 1 is an example diagram of a distributed data processing system environment in which aspects of the illustrative embodiments may be implemented and at least some of the computer code involved in performing the inventive methods may be executed;

DETAILED DESCRIPTION

Figure 2:
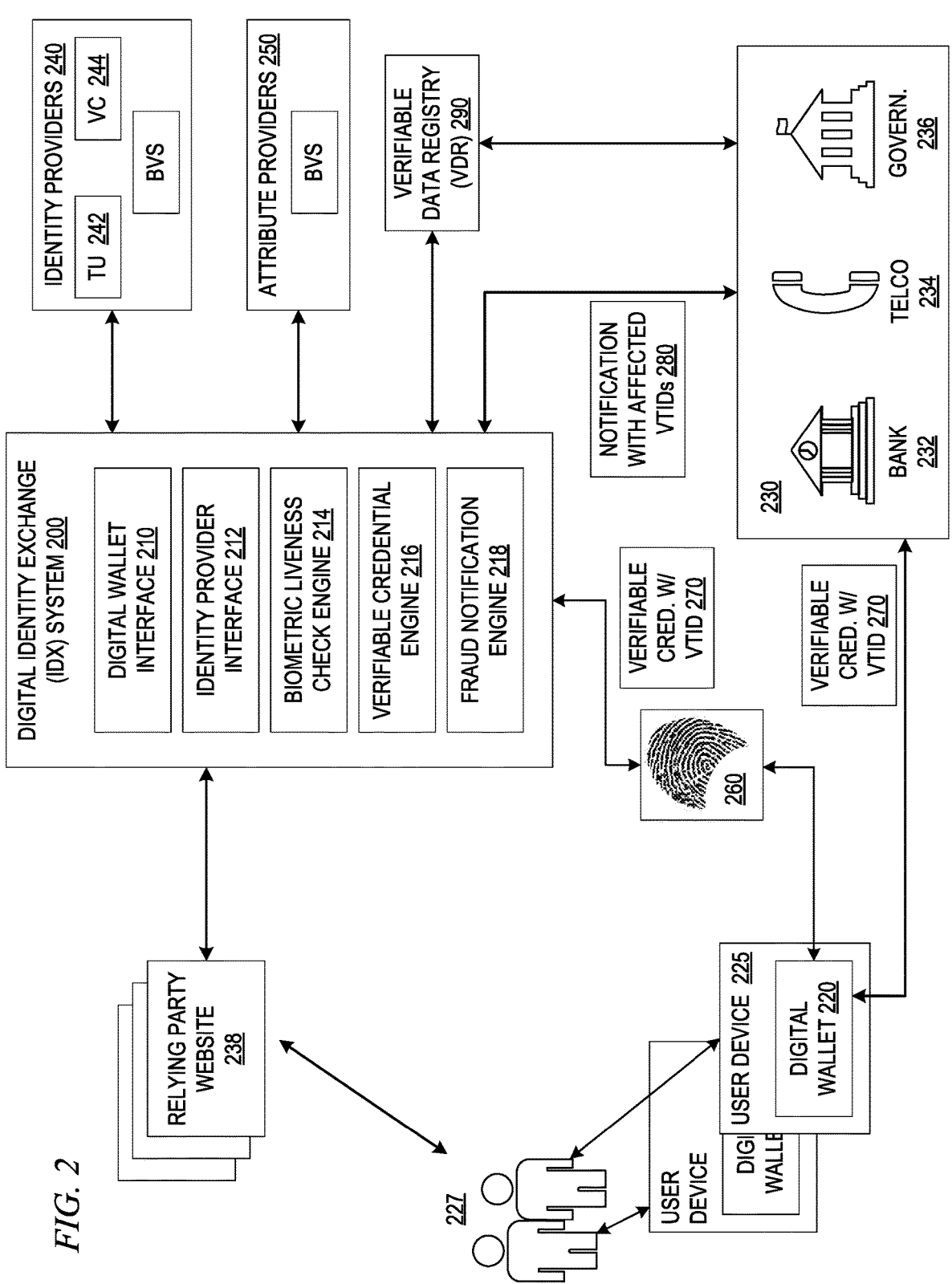
FIG. 2 is an example block diagram illustrating the primary operational components of a digital Identity Exchange (IDX) computing system and corresponding computing environment in accordance with one illustrative embodiment.
Figure 3A:
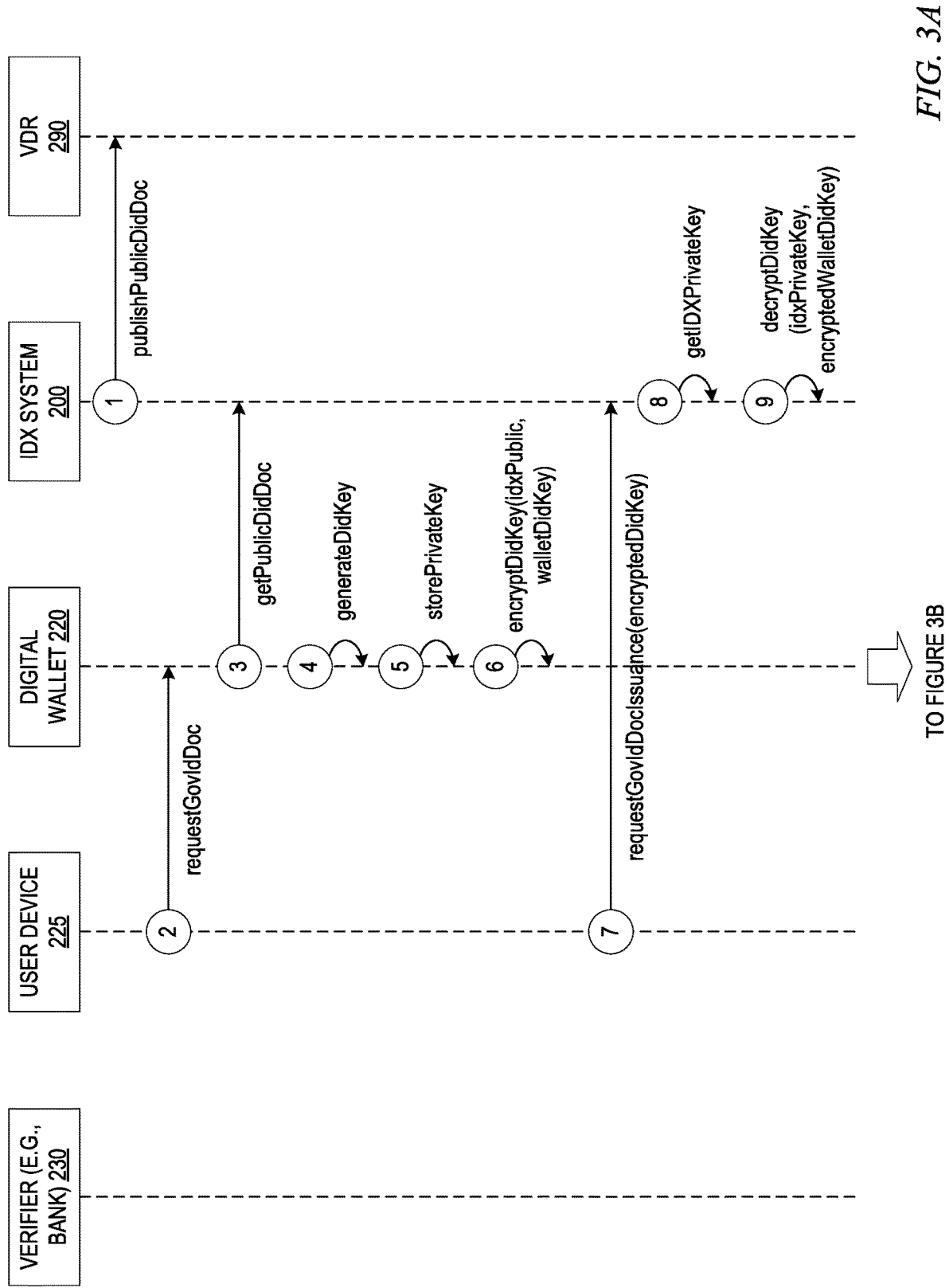
FIGS. 3A-3F are an authentication credential issuance flow diagram in accordance with one illustrative embodiment.
Figure 3B:
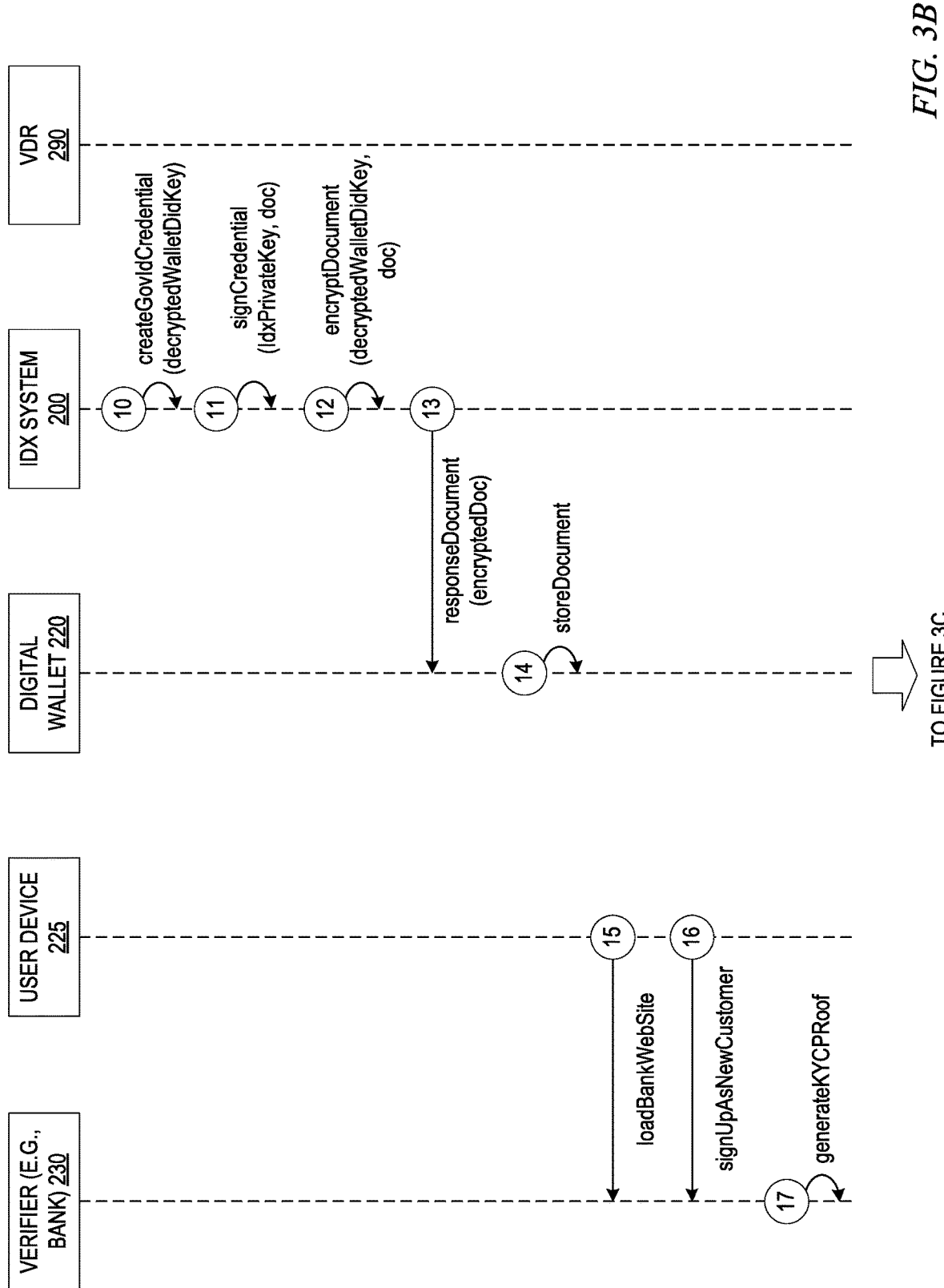
Figure 3C:
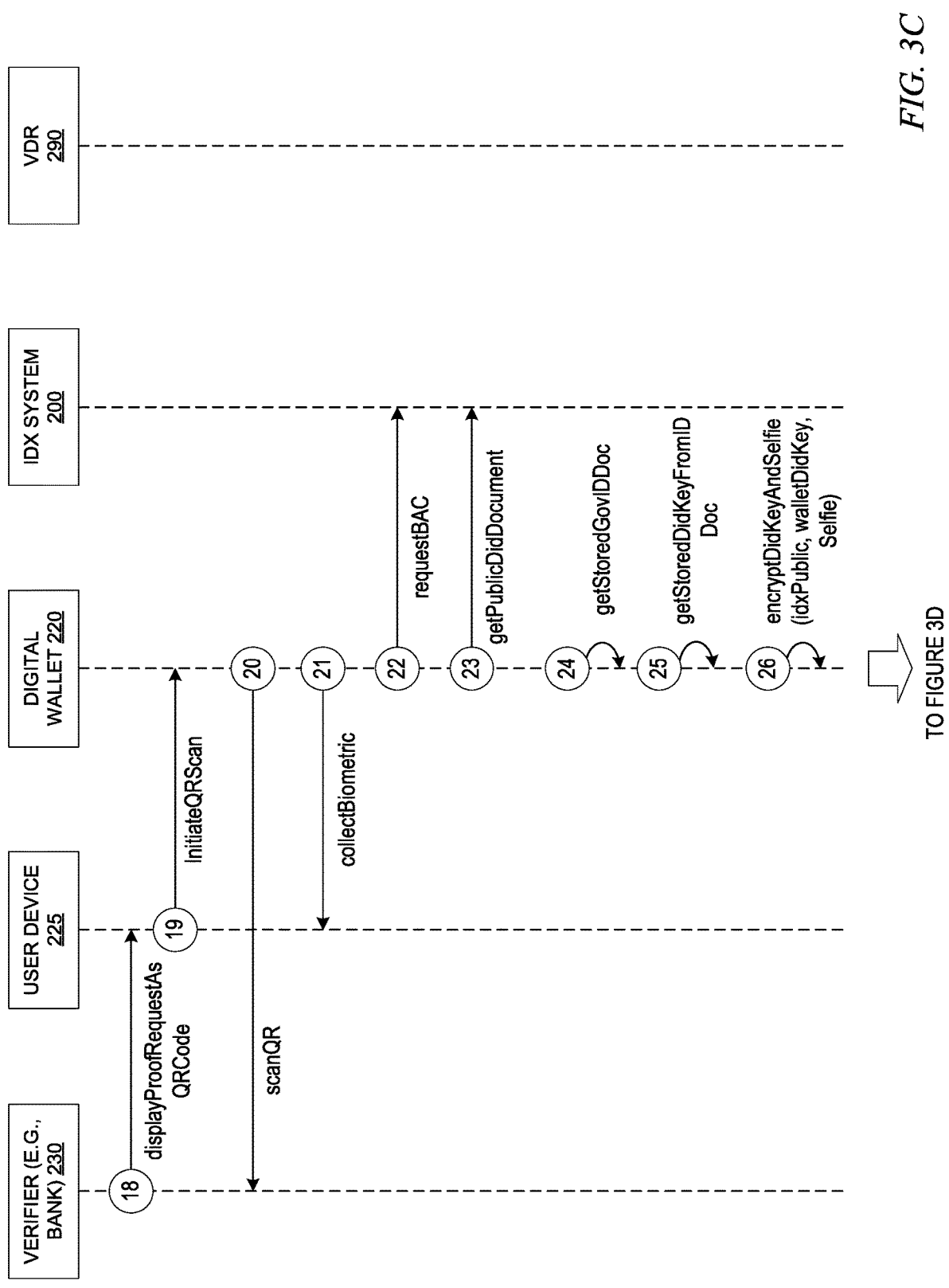
Figure 3D:
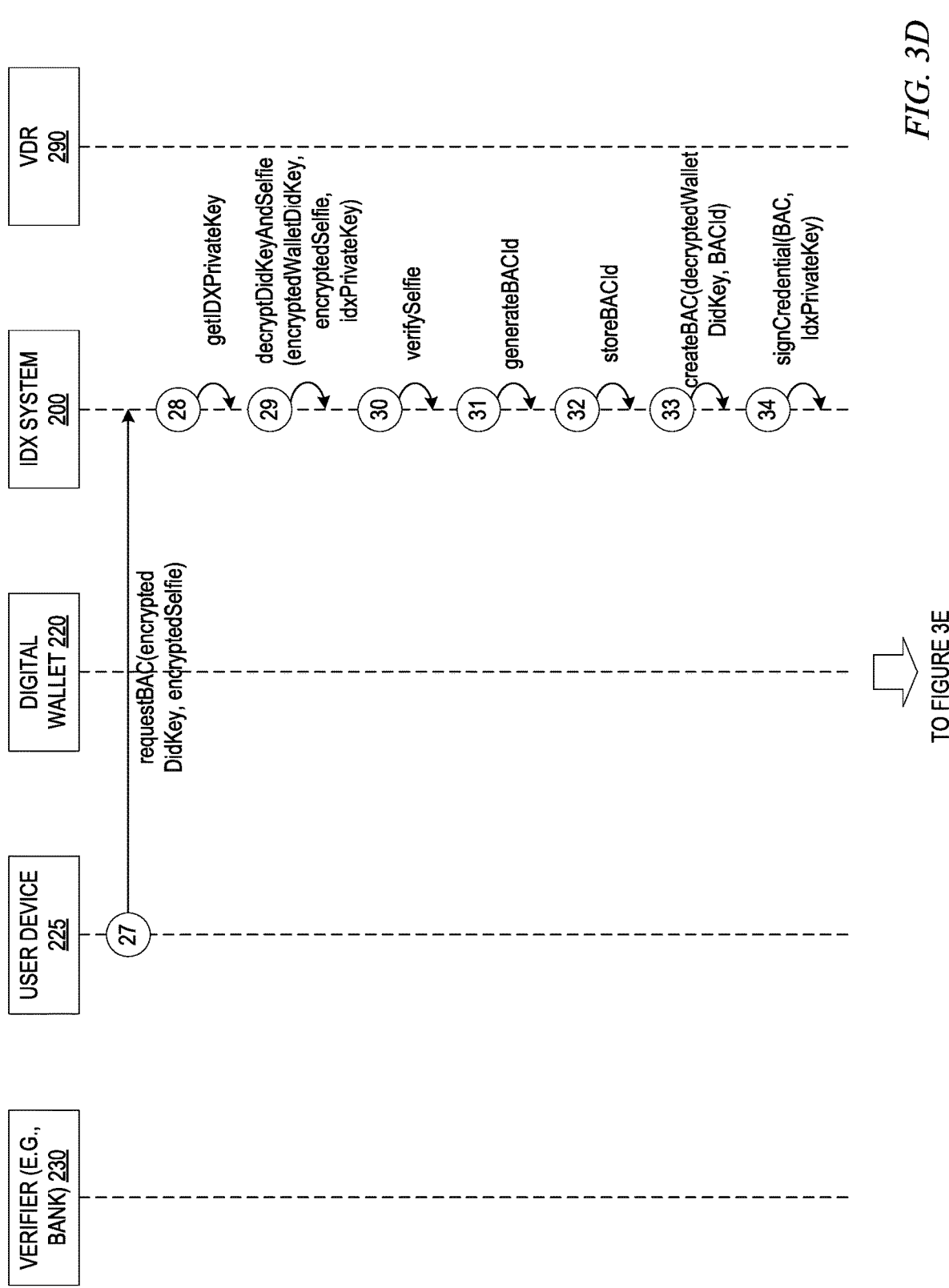
Figure 3E:
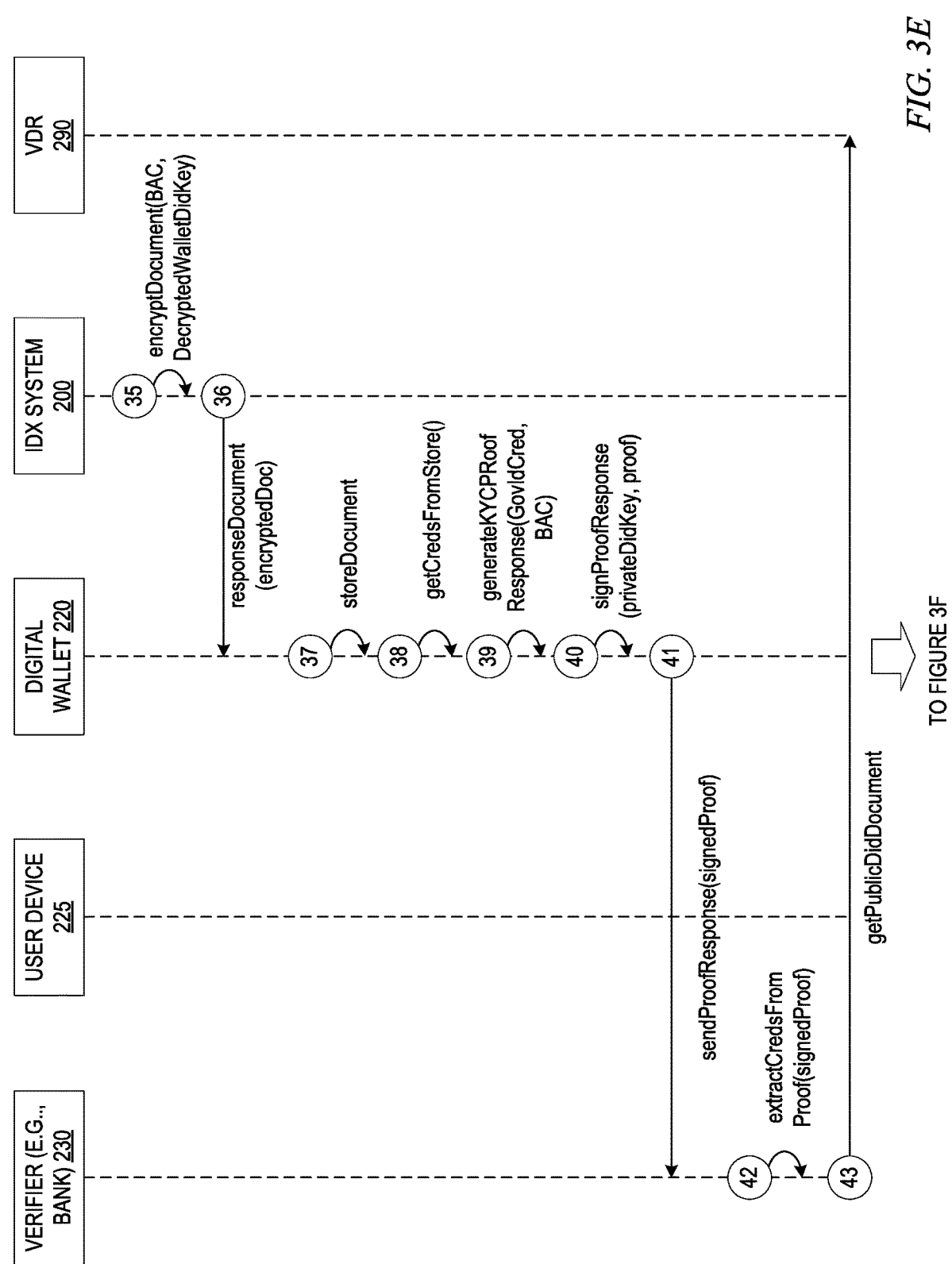
Figure 3F:
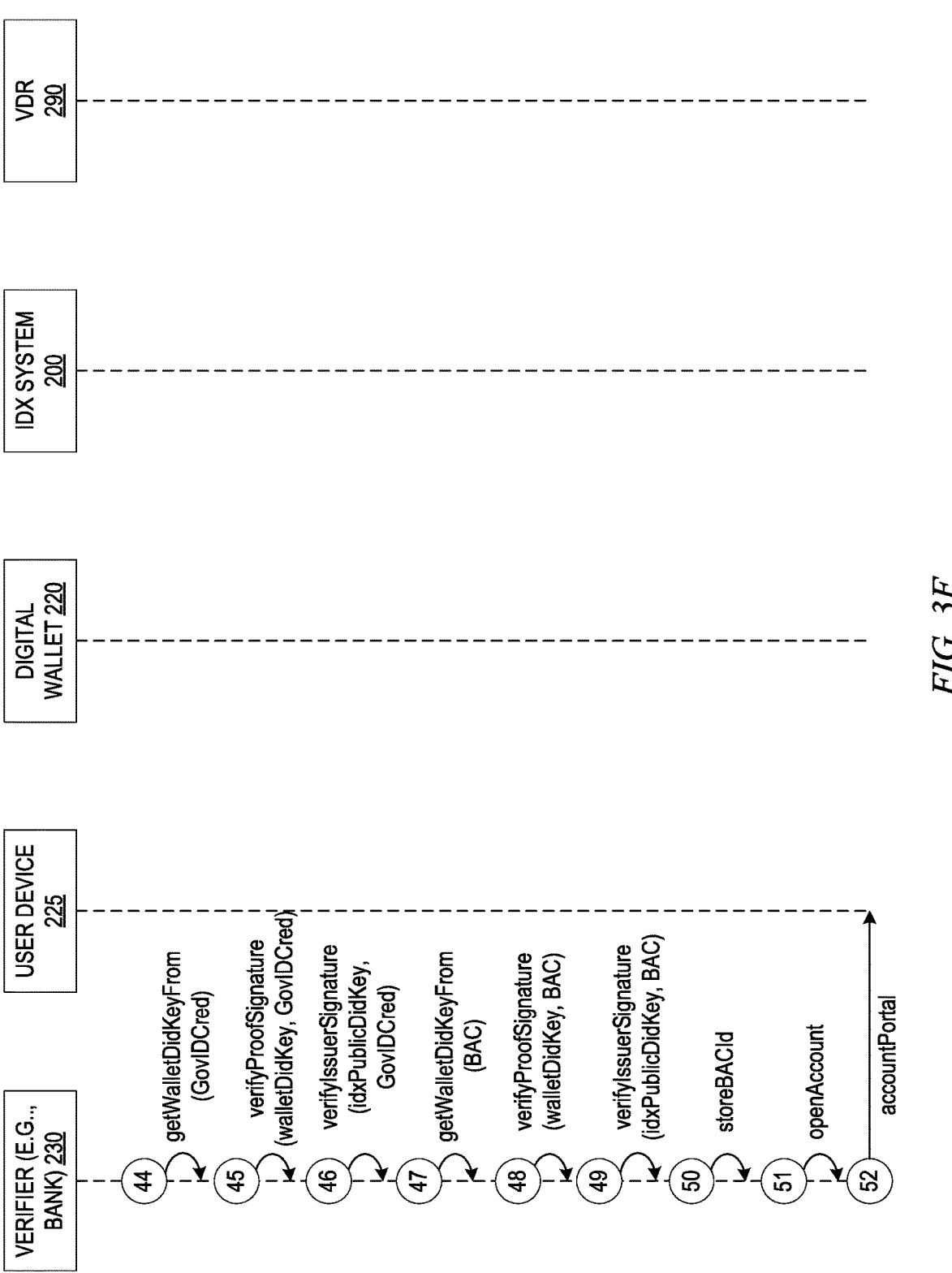

The illustrative embodiments provide an improved computing tool and improved computing tool operations/functionality for decentralized digital identity exchange for fraud detection. The mechanisms of the illustrative embodiments provide a digital identity exchange that permits individual service provider computing systems, which are identity document issuers and which implement identity confirmations to provide their services, to maintain their own identity documentation in a decentralized manner, yet leverage the digital confirmations provided by the digital identity exchange to provide fraud detection through trusted connections between these computing systems and the digital identity exchange computing system. These separate service provider computing systems, identity issuer computing systems, and the like, each of which are referred to generally as siloed identity source computing systems and siloed ecosystems herein, because they represent a separate siloed environment for identity based services, utilize trusted digital verifiable credentials from the digital identity exchange to ensure that transactions are not fraudulent, or if fraudulent, are quickly identified so that mitigation actions can be taken. All of this is done without requiring a single federated identity system be used by all the siloed ecosystems.

The following description provides examples of embodiments of the present disclosure, and variations and substitutions may be made in other embodiments. Several examples will now be provided to further clarify various aspect of the present disclosure.

Example 1: A method, in a data processing system specifically configured to provide a decentralized identity exchange (IDX) is provided. The method comprises receiving, from a relying party computing system, a request for identity verification of a user requesting access to one of data, resources, or services of the relying party. The method further comprises transmitting, by the IDX of the data processing system, to a digital wallet associated with the user, a request for current biometric data of the user. The method also comprises receiving, from the digital wallet, the current biometric data and performing a biometric liveness check on the current biometric data based on previously stored biometric data. In response to the biometric liveness check indicating the current biometric data matches the previous stored biometric data, the method comprises generating a verification transaction ID (VTID) and a verifiable credential for the user. The VTID is a unique identifier that comprises a representation of when the identity of the user was verified by the IDX. Moreover the method comprises transmitting the verifiable credential and VTID to the digital wallet. The digital wallet sends the verifiable credential and VTID to the relying party computing system to verify the identity of the user to the relying party computing system.

The above limitations advantageously enable a digital identity exchange to ensure transactions are not fraudulent while allowing identity providers to maintain their own separate identity verification mechanisms, while also not requiring a single federated identity system. This increases the security of transactions by not having all identity credentials maintained in a single centralized federated identity system.

Example 2: The limitations of any of Examples 1 and 3-10, where the method further comprises receiving, by the IDX, a fraud event notification from an identity credential issuing organization computing system, identifying, by the IDX, based on the fraud event notification, one or more VTIDs affected by the fraud event based on a correlation index of an identification, in the fraud event notification, of identity credentials affected by the fraud event with previously generated VTIDs generated by the IDX, and broadcasting a notification to a plurality of relying party computing systems, a notification of the fraud event specifying the one or more VTIDs affected by the fraud event. The above limitations advantageously allow for broadcast notification of which specific VTIDs are affected by a fraud event to a plurality of relying party computing systems which can then determine if they may have been compromised, all without divulging the identity credentials from another siloed identity source computing system or ecosystem.

Example 3: The limitations of any of Examples 1-2 and 4-10, where the plurality of relying party computing systems check local systems for a presence of the one or more VTIDS affected by the fraud event, and in response to a first relying party computing system, in the plurality of relying party computing systems, finding at least one of the one or more VTIDs affected by the fraud event in a first local system, the first relying party computing system performs one or more fraud mitigation operations. The above limitations advantageously allow relying parties to quickly and automatically determine if their resources may have been affected by fraud events occurring with identity providers via the IDX based on VTIDs without divulging the individual identity verification credentials used by the identity providers to the relying parties.

Example 4: The limitations of any of Examples 1-3 and 5-10 where the IDX maintains a mapping, for each siloed identity source computing systems in a plurality of siloed identity source computing systems, of an identity of the siloed identity source computing system and VTIDs generated for transactions associated with the requests for identity verification targeting the siloed identity source computing system, and wherein each siloed identity source computing system maintains their own identity verification mechanism separate from other siloed identity source computing systems, in the plurality of siloed identity source computing systems, without a federated identity system. The above limitations advantageously allow the IDX to identify which VTIDs are associated with different identity source computing systems and thereby identify which VTIDs may be subject to fraud events based on fraud event notifications.

Example 5: The limitations of any of Examples 1-4 and 6-10, where each of the plurality of siloed identity source computing systems are service providers that require verification of identity of users prior to providing services to the users. The above limitations advantageously permit a plurality of service providers to utilize the IDX while maintaining their siloed identity verification requirements.

Example 6: The limitations of any of Examples 1-5 and 7-10, where the plurality of siloed identity source computing systems comprise at least one of commercial organization computing systems, or government organization computing systems, which issue identity credentials to users. The above limitations advantageously permit commercial and/or government organizations to issue identity verification credentials that are maintained separate to each identity credential issuing organization, yet still provide a decentralized identity exchange for interoperability between different identity credential issuers and different relying parties.

Example 7: The limitations of any of Examples 1-6 and 8-10, where the plurality of siloed identity source computing systems comprise a driver's license issuing organization computing system or a passport issuing organization computing system. The above limitations advantageously allow the mechanisms of the illustrative embodiments to provide a decentralized identity exchange specifically for digital verification of government issued identity credentials such as driver's license and passports.

Example 8: The limitations of any of Examples 1-7 and 9-10, where the current biometric data comprises an image of the user captured by an image capture device associated with the digital wallet in response to the digital wallet receiving the request for current biometric data of the user. The above limitations advantageously allow the IDX mechanisms to operate with facial verification systems that operate on captured images of users wishing to engage in transactions with relying parties.

Example 9: The limitations of any of Examples 1-8 and 10, where the biometric liveness check on the current biometric data based on previously stored biometric data is performed by a biometric verification system (BVS) implemented at an identity provider computing system separate from the IDX and results of the biometric liveness check are provided to the IDX. The above limitations advantageously allow identity provider computing systems to maintain their own BVS for verification purposes, yet still leverage the advantages of the IDX with regard to providing Example 10: The limitations of any of Examples 1-9, where the request for identity verification of a user from the relying party comprises a machine only readable code which is scanned by the digital wallet and causes the digital wallet to automatically initiate a verification process of the IDX comprising the transmitting the request for current biometric data of the user, receiving the current biometric data, performing a biometric liveness check, generating a VTID and a verifiable credential for the user, and transmitting the verifiable credential and VTID to the digital wallet. The above limitations allow for the automated initiation of verification processes via the IDX and the digital wallet in response to a relying party requesting identity verification for the user.

Example 11: A system comprising one or more processors and one or more computer-readable storage media collectively storing program instructions which, when executed by the one or more processors, are configured to cause the one or more processors to perform a method according to any one of Examples 1-10. The above limitations advantageously enable a system comprising one or more processors to perform and realize the advantages described with respect to Examples 1-10.

Example 12: A computer program product comprising one or more computer readable storage media, and program instructions collectively stored on the one or more computer readable storage media, the program instructions comprising instructions configured to cause one or more processors to perform a method according to any one of Examples 1-10. The above limitations advantageously enable a computer program product having program instructions configured to cause one or more processors to perform and realize the advantages described with respect to Examples 1-10.

Example 13: A computer-implemented method, system or computer program product for providing a decentralized identity exchange (IDX). The computer-implemented method, system or computer program product comprises operations including receiving, from a relying party computing system, a request for identity verification of a user requesting access to one of data, resources, or services of the relying party. The computer-implemented method, system or computer program product further comprises operations including transmitting, by the IDX of the data processing system, to a digital wallet associated with the user, a request for current biometric data of the user. The computer-implemented method, system or computer program product further comprises operations including receiving, from the digital wallet, the current biometric data and performing a biometric liveness check on the current biometric data based on previously stored biometric data. In response to the biometric liveness check indicating the current biometric data matches the previous stored biometric data, the computer-implemented method, system or computer program product further comprises operations including generating a verification transaction ID (VTID) and a verifiable credential for the user. The VTID is a unique identifier that comprises a representation of when the identity of the user was verified by the IDX. Moreover the computer-implemented method, system or computer program product further comprises operations including transmitting the verifiable credential and VTID to the digital wallet. The digital wallet sends the verifiable credential and VTID to the relying party computing system to verify the identity of the user to the relying party computing system. The computer-implemented method, system or computer program product further comprises operations including receiving, by the IDX, a fraud event notification from an identity credential issuing organization computing system, identifying, by the IDX, based on the fraud event notification, one or more VTIDs affected by the fraud event based on a correlation index of an identification, in the fraud event notification, of identity credentials affected by the fraud event with previously generated VTIDs generated by the IDX, and broadcasting a notification to a plurality of relying party computing systems, a notification of the fraud event specifying the one or more VTIDs affected by the fraud event. The above example advantageously realizes the benefits described with respect to Examples 1 and 2 above.

Example 14: A computer-implemented method, system or computer program product for providing a decentralized identity exchange (IDX). The computer-implemented method, system or computer program product comprises operations including receiving, from a relying party computing system, a request for identity verification of a user requesting access to one of data, resources, or services of the relying party. The computer-implemented method, system or computer program product further comprises operations including transmitting, by the IDX of the data processing system, to a digital wallet associated with the user, a request for current biometric data of the user. The computer-implemented method, system or computer program product further comprises operations including receiving, from the digital wallet, the current biometric data and performing a biometric liveness check on the current biometric data based on previously stored biometric data. In response to the biometric liveness check indicating the current biometric data matches the previous stored biometric data, the computer-implemented method, system or computer program product further comprises operations including generating a verification transaction ID (VTID) and a verifiable credential for the user. The VTID is a unique identifier that comprises a representation of when the identity of the user was verified by the IDX. Moreover the computer-implemented method, system or computer program product further comprises operations including transmitting the verifiable credential and VTID to the digital wallet. The digital wallet sends the verifiable credential and VTID to the relying party computing system to verify the identity of the user to the relying party computing system. The IDX maintains a mapping, for each siloed identity source computing systems in a plurality of siloed identity source computing systems, of an identity of the siloed identity source computing system, VTIDs generated for transactions associated with the requests for identity verification targeting the siloed identity source computing system. Each siloed identity source computing system maintains their own identity verification mechanism separate from other siloed identity source computing systems, in the plurality of siloed identity source computing systems, without a federated identity system. The plurality of relying party computing systems check local systems for a presence of the one or more VTIDS affected by the fraud event, and in response to a first relying party computing system, in the plurality of relying party computing systems, finding at least one of the one or more VTIDs affected by the fraud event in a first local system, the first relying party computing system performs one or more fraud mitigation operations. The above example advantageously realizes the benefits described with respect to Examples 1, 2, and 3 above.

Example 15: A computer-implemented method, system or computer program product for providing a decentralized identity exchange (IDX). The computer-implemented method, system or computer program product comprises operations including receiving, from a relying party computing system, a request for identity verification of a user requesting access to one of data, resources, or services of the relying party. The computer-implemented method, system or computer program product further comprises operations including transmitting, by the IDX of the data processing system, to a digital wallet associated with the user, a request for current biometric data of the user. The computer-implemented method, system or computer program product further comprises operations including receiving, from the digital wallet, the current biometric data and performing a biometric liveness check on the current biometric data based on previously stored biometric data. In response to the biometric liveness check indicating the current biometric data matches the previous stored biometric data, the computer-implemented method, system or computer program product further comprises operations including generating a verification transaction ID (VTID) and a verifiable credential for the user. The VTID is a unique identifier that comprises a representation of when the identity of the user was verified by the IDX. Moreover the computer-implemented method, system or computer program product further comprises operations including transmitting the verifiable credential and VTID to the digital wallet. The digital wallet sends the verifiable credential and VTID to the relying party computing system to verify the identity of the user to the relying party computing system. The IDX maintains a mapping, for each siloed identity source computing systems in a plurality of siloed identity source computing systems, of an identity of the siloed identity source computing system, VTIDs generated for transactions associated with the requests for identity verification targeting the siloed identity source computing system. Each siloed identity source computing system maintains their own identity verification mechanism separate from other siloed identity source computing systems, in the plurality of siloed identity source computing systems, without a federated identity system. The above example advantageously realizes the benefits described with respect to Examples 1 and 4 above.

As noted above, fraud and identity theft are serious problems in modern society, at least due in part to the adoption of computing systems and data networks in every facet of modern life. A common solution approach employed by governments to combat such instances of fraud, such as welfare fraud or other government/organization services, is the deployment of a central digital identity system. These central systems are based on federated single sign-on technologies such as Security Assertion Markup Language (SAML) and/or OpenID Connect (OIDC). In many cases, such systems have been successfully deployed across government owned and managed departments and agencies. Unfortunately, these centralized systems encounter adoption and integration barriers and resistance from the wider ecosystem of product/service provider organizations and other legal entities (e.g., banks).

In the SAML and OIDC world, these ecosystem entities are known as registered partners or relying parties. The registration requirements and interfaces to such systems are often a source of adoption resistance by prospective partners. Another barrier to adoption can result when industry sectors have their own centralized and or federated digital identity systems and prefer the users, who are often also the same citizens in a government digital identity system, to register within the industry sector specific federation system. The result is a multiplicity of central digital identity systems that are disconnected or siloed from one another. Users are forced to create digital identities in each ecosystem in which they participate, resulting in the users' identity document attributes being stored in multiple siloed identity systems. Further, the lack of integrated digital identity systems can be exploited by bad actors, i.e., fraudsters, across these siloed ecosystems.

Industry sector specific ecosystems often prefer, or are required by regulation, to verify and establish the identity of new, and in some cases existing, users by means of government issued identity credentials. Common credentials examples are driver's licenses, passports, health care cards, pension cards, and the like. That is, government issued identity credentials are still often physical identity documents that users must have physical possession of in order to use these documents to have access to government or organization services.

Verifying a user's identity online commonly requires the user to enter their identity document attributes, obtained from the physical identity document. These identity document attributes are validated against a Document Verification System (DVS) for confirmation of legitimacy, and then stored by the organization for auditing and future fraud detection. Knowledge of the attribute values, however, does not necessarily confirm the document is held by the individual it was issued to, i.e., a fraudster can access the information on the identity document and not have to have physical possession of the identity document. To combat this, various cumbersome mechanisms, such as security questions, 2-factor authentication, and the like, have been employed to try to verify the identity of a user attempting to gain access to a computing system, protected data, or services. However, these mechanisms can be circumvented when a sophisticated bad actor, or fraudster, gains access to information for answering security questions, diverting or circumventing the 2-factor authentication, or the like.

Thus, existing systems implement siloed identity ecosystems that are maintained separate, or require that these separate identity ecosystems subscribe to a single sign-on federated identity system. Moreover, current government identity documents allow for fraudsters to gain access to resources, protected data, and services as long as the entity requesting access has information from the identity documents. Therefore, there is a need for an improved computing tool and improved computing tool operations/functionality that provide a solution capable of bridging siloed identity ecosystems without mandating adoption of any one single federated identity system. Moreover, there is a need for an improved computing tool and improved computing tool operations/functionality that provide a solution that can leverage digital verifiable credentials that are trusted across separate siloed identity ecosystems, both commercial organizations and in government organizations. In some illustrative embodiments, it is beneficial to implement an improved computing tool and improved computing tool operations/functionality that provides a biometric level of assurance, which indicates that the identity credential is presently held by the individual it was issued to, in a manner that minimizes the potential for a bad actor or fraudster to spoof, or fraudulently assert, possession of the identity credential, e.g., government issued identity document.

The illustrative embodiments provide such an improved computing tool and improved computing tool operations/ functionality via a digital identity exchange (IDX) computing system. The IDX computing system is connected to various siloed identity based service providers and is able to issue verifiable credentials on behalf of them. As a result, the end-user is no longer required to upload their identity attributes to multiple siloed identity based service providers. The IDX computing system provides an ability to connect to identity source computing systems directly, i.e. the original issuer and owner of the identities that are provided to the users, e.g., a government organization issuing a government identification document, such as a driver's license, or the like. The IDX computing system may additionally provide the end-user with the ability to connect a federated identity capable of document and biometric, e.g., facial, verification and change identity providers if they wish as well.

Organizations that require verification of identity before providing a service are able to use a verifiable digital credential presented by the user, such as through a digital wallet controlled by the user, and verified by the IDX computing system. Through this digital wallet, the user may control what information is shared to a relying party by the IDX computing system, which may be specified in a user profile that is previously established, or through a dynamic interface with the user upon the IDX computing system verifying the user's identity based on the digital credential provided from the digital wallet. The IDX computing system, based on the verification of the digital credential from the user's digital wallet issues its own verifiable digital credential with a verification transaction identifier (VTID), which may be provided to the relying party along with any other information that the user agrees to provide via the digital wallet. These VTIDs are unique identifiers generated by the IDX computing system and provide a representation of when the identity of the credential subject, i.e., the user, was verified by the IDX computing system. Credential formats include W3C DIDs or ISO mDL 18013 standards. This provides product and service providers with a interoperable method of obtaining verifiable credentials, regardless of their source.

The IDX computing system, being the issuer of the verifiable digital credentials and VTIDS, implements a notification service to which any party may subscribe, e.g., any commercial or government organization that relies on user identities to provide access to resources, data, or services, or which provides identities to users, e.g., identity issuers. If fraud is detected by an identity provider, for example, and the identity provider computing system sends a fraud event notification to the IDX computing system, the IDX computing system will then, via the notification service, send a notification to all parties subscribed to the notification service with the affected VTIDs. That is, the IDX computing system, based on the information in the fraud event notification, e.g., identifier/username of the fraud subject, identifies which VTIDs are affected by the fraud event, such as based on a correlation index of provider names to IDX identifiers, to VTIDs, for example, and publishes/broadcasts a notification to subscribers of the VTIDs affected.

Upon receipt of a fraud notification from the IDX computing system, subscribers, such as commercial or government organizations and entities that accept and verify digital verifiable credentials that have been issued by the IDX computing system, may check their computing systems for the affected VTIDs. If the VTID is found in their computing systems, these commercial/government organizations and entities may proceed with their fraud mitigation procedures in response to the notification from the IDX computing system.

It should also be appreciated that the IDX computing system may also detect fraud based on irregularities in the exchange between the IDX computing system and digital wallets of users. If fraud is detected in such exchanges with the IDX computing system, the IDX computing system may instigate the identification of the affected VTIDs and may initiate sending of notifications to organizations and entities that may have been affected by the fraud, where these notifications specify the VTIDs that were affected.

To confirm ownership of the verifiable credential, the identity verification computing system, e.g., the IDX computing system, an identity issuer, service provider computing system, or the like, may ask (challenge) the user of the digital wallet for a biometric liveliness assertion during a verifiable credential proof presentation. To fulfil this request, the user captures a digital image of themselves, such as via a digital camera on their phone, their computing device, or the like, and sends the digital image to the issuer of the primary verifiable credential. In a preferred implementation, this function is enabled by the user's verifiable credential wallet. The IDX computing system, as the credential issuer, is responsible for completing a biometric verification using a Biometric Verification System (BVS), which in examples included herein may be a Facial Verification System (FVS). Upon successful BVS verification, the IDX computing system issues a new short lived verifiable credential to the user's digital wallet. This second credential includes the VTID from the primary verifiable credential and can be used by the verifier and matched against the VTID from the primary verifiable credential. The verifier is then able to validate the credentials themselves, along with the short lived biometric liveliness assertion from the issuer.

Thus, in some illustrative embodiments, a Biometric Verification System (BVS) can be used to biometrically validate a document, e.g., passport or driver's license, belongs to the individual by capturing a digital photo of the user, and comparing it to the digital image associated with these documents. It should be appreciated that the digital image capture and BVS are only one example of a biometric validation mechanism, and other biometric validation mechanisms may likewise be used in replacement of, or in addition to, these digital image and BVS mechanisms. For example, digital image captures of fingerprints, voice pattern recognition, retina scans, vital sign patterns, and other biometric information may be used as a basis for biometric validation.

The above illustrative embodiments address various considerations in existing systems that lead to possible fraudulent activity, especially with regard to identity theft and fraudulent access to resources, protected data, and services. For example, these considerations include the fact that government credentials are often physical artifacts, and these physical artifacts are copied and stored during verification ceremonies. Due to auditing and fraud detection requirements, stored credentials are at risk of identity theft in a data breach. This is especially true when requiring different relying parties to agree to a centralized federated identification mechanism in that if this centralized system is breached, it is possible that the bad actor or fraudster can gain access to many different protected resources, data, and services.

Moreover, additional considerations addressed by the mechanisms of the illustrative embodiments include the fact that notification of post verification fraud or compromised credentials used by a bad actor, is often difficult or almost impossible due to the siloed identity systems commonly found in commercial/governmental organizations. Existing government detection of fraud or compromise of a digital identity cannot be used to commonly notify organizations and commercial ecosystems of the fraud or compromise. Similarly, organizations and commercial ecosystem detected fraud or compromise cannot simply notify government organizations and computing systems, completely or reliably, to combat further fraud or compromise. This process commonly takes months to process and identity individuals that are affected by the fraud or compromise.

The illustrative embodiments address these considerations by providing an improved computing tool and improved computing tool operations/functionality that implements a digital identity exchange (IDX) computing system that interfaces between siloed identity ecosystems and user digital wallets to provide a trusted intermediary for issuing verification credentials and providing VTIDs that can be used to quickly notify affected relying parties when a fraud or compromise of a user's identity is detected, either at the IDX computing system, the relying party, an identity issuer, or other verifier of a user's identity. The VTIDs and the IDX computing system's notification system provide for the broadcasting of affected VTIDs in the case of a breach of a party's computing system, to subscribers to the IDX computing system's notification system. The subscribers may then check their own computing systems to determine if the affected VTIDs in the broadcast notification are present and if so, take appropriate mitigation actions to prevent fraud or compromise of their protected resources, data, and/or services.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides a digital identity exchange. The improved computing tool implements mechanism and functionality, such as providing trusted verification of digital wallet credentials from users for reliance by parties in a decentralized digital identity credentials system, which cannot be practically performed by human beings either outside of, or with the assistance of, a technical environment, such as a mental process or the like. The improved computing tool provides a practical application of the methodology at least in that the improved computing tool is able to provide trusted verification of the user and user identity credentials in a decentralized digital identity exchange ecosystem.

FIG. 1 is an example diagram of a distributed data processing system environment in which aspects of the illustrative embodiments may be implemented and at least some of the computer code involved in performing the inventive methods may be executed. That is, computing environment 100 contains an example of an environment for the execution of at least some of the computer code involved in performing the inventive methods, such as digital Identity Exchange (IDX) computing system 200. In addition to IDX computing system 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and IDX computing system 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in IDX computing system 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in IDX computing system 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As shown in FIG. 1, one or more of the computing devices, e.g., computer 101 or remote server 104, may be specifically configured to implement a digital identity exchange (IDX) computing system 200. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computer 101 or remote server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates decentralized digital identity exchanges and verification of user identity from a user digital wallet, where a centralized federated single sign-on mechanism is avoided.

FIG. 2 is an example block diagram illustrating the primary operational components of a digital Identity Exchange (IDX) computing system 200 and corresponding computing environment in accordance with one illustrative embodiment. The operational components shown in FIG. 2 may be implemented as dedicated computer hardware components, computer software executing on computer hardware which is then configured to perform the specific computer operations attributed to that component, or any combination of dedicated computer hardware and computer software configured computer hardware. It should be appreciated that these operational components perform the attributed operations automatically, without human intervention, even though inputs may be provided by human beings, e.g., requests to access resources, data, or services, digital wallet transactions, etc., and the resulting output may aid human beings, e.g., identifying fraud events. The invention is specifically directed to the automatically operating computer components directed to improving the way that decentralized digital identity exchanges to avoid fraud events are performed, and providing a specific solution that implements the digital identity exchange (IDX) computing system and its corresponding operations and functionality that cannot be practically performed by human beings as a mental process and is not directed to organizing any human activity.

As shown in FIG. 2, the digital identity exchange computing system 200 comprises a digital wallet interface 210, an identity provider interface 212, a biometric liveness check engine 214, a verifiable credential engine 216, and a fraud notification engine 218. The digital wallet interface 210 provides the computer logic to communicate with digital wallets 220 of one or more user devices 225 corresponding to one or more users 227, when performing verification of identity via the IDX computing system 200. The digital wallets 220 are applications and data storage devices that operate to securely store and provide cryptographically verifiable credential and financial documents in an electronic manner. Digital wallets 220 may be used to store payment options, such as credit and debit cards, gift cards, coupons, etc., which can then be used, via the digital wallet 220 authentication mechanisms and data processing/ communication mechanisms, to perform transactions with other entities. The digital wallet 220 further stores digital credentials 260 to allow authorized users 227 to access services, data, and resources associated with relying parties via the user devices 225.

The identity provider interface 212 provides the computer logic to communicate with identity providers 240 and attribute providers 250 to verify the digital credentials 260 provided by the digital wallets 220 and provide results of a verification back to the IDX computing system 200 for use in providing short lived verifiable credentials with VTIDs 270 from the IDX computing system 200 back to the digital wallets 220. The IDX computing system 200 may also use the identity provider interface 212 when it issues digital credentials to a users' digital wallets 220. For example, the IDX computing system 200 may be an issuer of a digital passport represented as a cryptographically verifiable credential. In this case, the Passport Office would be the attribute provider 250 for providing the attribute data that are to be included in the digital passport to be issued by the IDX computing system 200 to the digital wallet 220.

An identity provider 240 may be, for example, a service that provides an ability to authenticate a user by means of an authentication method, e.g., a website may authenticate a user if the user supplies their username and password. A relying party 230 can use this capability to "outsource" authentication to the identity provider 240. In the present example, an identity provider 240 may be a government department, e.g. Tax/IRS, Social Security, or the like, where the user has an account and password. An identity provider 240 can also be an attribute provider 250.

An attribute provider 250 may be a provider of user attributes known or registered with the identity provider 240. A pure attribute provider 250 simply holds user attributes but does not act or have ability to authenticate a user, such as in the case of an identity provider 240. A possible attribute provider 250 example may be, for example, the Passport Office or other entity that has a relationship with the IDX system 200 and users 227.

The digital credentials 260 sent to the IDX computing system 200 may comprise biometric information captured by the digital wallet 220 mechanisms, such as a facial image capture from the user 227 via a digital camera or other image capture device associated with the user device 225, a fingerprint capture device, a voice pattern capture device, or the like. The captured digital credentials 260 may be provided to the IDX computing system 200 which may then provide them to the appropriate identity provider 240 and/or attribute provider 250 for verification against stored data for a trusted user 242 and provide verified credentials 244 in response to the verification resulting in the captured digital credentials 260 being of a verified user 227. The selection of which identity provider 240 or attribute provider to send the captured digital credentials 260 to may be based on varying criteria. For example, the relying party 230 that is attempting to verify a new user 227 may indicate, via the user's digital wallet 220, that is prefers the verification to be done with the Passport Office attribute provider 250. In another case, the verification may be preferred with a driver's license department as an identity provider 240. In yet another case, a configuration setting may be provided in the IDX computing system 200 that specifies which identity providers 240 or attribute providers 250 are to perform verification with particular types of captured digital credentials 260.

Thus, if a person 227 wishes to engage with a service provider (SP), such as a relying party 230 (e.g., bank 232 or the like), the relying party or service provider (SP) 230 needs to establish or otherwise verify the person's identity. This will be done via presentation of a verifiable credential (VC) held by the person 227 in their digital wallet 220. The SP 230 requests or initiates the presentation process, such as via a QR code, bar code, other machine only readable code, or the like, which when accessed, e.g., scanned, by the digital wallet 220, executes subsequent flows as described hereafter. Only when the SP 232 has successfully verified the user by way of a primary verifiable credential (e.g., a driver's license or the like) and a short lived biometric authentication credential is issued by the IDX computing system 200, will the SP 232 proceed on to the actual providing of the service.

For example, in response to a relying party 230, such as bank 232, telecommunications provider 234, or government organization 236, requesting verification of the user 227 in response to the user initiating a transaction with the relying party 230, such as by scanning a QR code, accessing the relying party website 238, or the like, the user's digital wallet 220, which stores the user's credentials, may be accessed and the digital wallet 220 may prompt the user 227 to capture biometric data, such as a facial image of the user 227, e.g., a two dimensional or TrueDepth photo, using a biometric data capture device of a user device 225, e.g., a digital camera associated with the user's smart phone, computing device, or the like, which may also host the digital wallet 220. A BVS associated with an identity provider 240 or attribute provider 250 may be invoked to perform BVS operations on the captured biometric data, e.g., a captured facial image, fingerprint image, voice print, or the like, which is provided by the digital wallet 220 to the IDX computing system 200.

The IDX computing system 200 comprises biometric liveness check engine 214 which comprises the computer logic for checking the biometric data of the digital credential 260, which may require invoking the BVS of one or more of the identity provider 240 or attribute provider 250. While the depicted example shows the IDX computing system 200 having the biometric liveness check engine 214, in some illustrative embodiments, this engine 214, or at least the functionality of this engine 214, may be integrated into the BVS of one or more of the identity providers 240 and/or attribute providers 250, with the IDX computing system having an interface for communicating with the BVS of the providers 240, 250. The BVS may compare the biometric information in the digital credentials 260 to stored known biometric information for the authorized individual 227. If there is a sufficient match, the digital credentials 260 are verified and a verified response is sent back to the biometric liveness check engine 214 of the IDX computing system 200. If the digital credentials 260 are not verified, a response is sent back indicating that the credentials are not verified and the IDX computing system 200 may take appropriate action to prevent completion of the transaction and potentially notify relying parties 230 of a potential fraud and specify the VTIDs affected by the potential fraud.

The short lived verifiable credentials 270, generated by the IDX computing system 200 in response to a verification of the digital credentials 260 by the IDX computing system 200 and/or the identity/attribute providers 240, 250, inform the digital wallet 220 that the user 227 has been verified and can send user specified credential information, e.g., identity attributes, biometric liveness check credentials, a VTID generated by the IDX computing system 200 for the transaction, etc., which the user 227 is willing to share with a relying party 230 when performing a transaction, e.g., an access of resources, data, or services. The VTIDs are unique and provide a representation of when the identity of the credentialed subject, e.g., the user 227, was verified by the IDX computing system 200. It should be appreciated that the relying party 232-236 may store the VTIDs for later use in performing mitigation actions in response to a fraud notification 280 broadcast from the IDX computing system 200, where these fraud notifications 280 specify the VTIDs affected by a fraud event and which may be matched to the VTIDs stored by the relying parties 232-236.

As noted previously, credential formats used by the elements of FIG. 2 may take many different forms including, for example, W3C DIDs or ISO mDL 18013 standards. Each verifiable digital credential 270 issued by the IDX computing system 200 includes a VTID.

The IDX computing system 200 comprises a verifiable credential engine 216 that comprises the computer logic configured to issue the verifiable digital credentials 270 in response to the digital credentials 260 being verified. The IDX computing system 200 also implements a fraud notification engine 218 that comprises computer logic configured to provide a notification service to which any party may subscribe, e.g., any commercial or government organization such as relying parties 230, that rely on user identities to provide access to resources, data, or services, or which provides identities to users, e.g., identity providers 240 and/or attribute providers 250.

If fraud is detected by an identity provider 240 in some other process (not shown in FIG. 2), for example, and the identity provider computing system 240 sends a fraud event notification to the IDX computing system 200, the IDX computing system 200 will then, via the fraud notification engine 218, send a notification 280 to all parties subscribed to the notification service provided by the fraud notification engine 218. The notification 280 comprises the affected VTIDs. That is, the IDX computing system 200, based on the information in the fraud event notification, identifies which VTIDs are affected by the fraud event and broadcasts a notification 280 to subscribers specifying the VTIDs affected. The IDX computing system 200 maintains indexes and correlation tables that allow it to associate a unique identity provider 240 identifier with an IDX computing system generated identifier. As each VTID is generated within the context of separate transactions, the IDX computing system associated the VTID with its own IDX identifier of the user, such as through a relation database mechanism. Thus, when a fraud is detected, based on the identity provider identifiers identified in the fraud notification, the correlation with the IDX identifier and the VTIDs is able to be performed and identify which VTIDs are affected by the fraud event.

Upon receipt of a fraud notification 280 from the IDX computing system 200, subscribers, such as commercial, e.g., bank 232, telco 234, or government organizations 236 and entities that accept and verify digital verifiable credentials 270 that have been issued by the IDX computing system 200, may check their computing systems for the affected VTIDs. If the VTID is found in their computing systems, these commercial/government organizations 232-236 and entities may proceed with their fraud mitigation procedures in response to the notification from the IDX computing system 200.

Biometric liveliness assertions by the identity provider computing systems 240 and/or attribute provider computing systems 250 may contain these VTIDs as well, and may be part of the fraud detection notification service of the fraud notification engine 218. This is to handle scenarios where the user chooses, via the digital wallet 220, not to share the VTID of the verifiable credential, e.g., identity document.

It should also be appreciated that the IDX computing system 200 may also detect fraud based on irregularities in the exchange between the IDX computing system 200 and digital wallets 220 of users 227 and may instigate the identification of the affected VTIDs and sending of notifications 280 to affected organizations and entities, i.e., relying parties 230.

As noted above, to confirm ownership of the verifiable credential, the identity verification computing system, e.g., the IDX computing system 200, an identity provider computing system 240, an attribute provider computing system 250, or the like, may ask (challenge) the user 227 of the digital wallet 220 for a biometric liveliness assertion during a verifiable credential proof presentation. To fulfil this request, the user 227 captures a digital image of themselves, such as via a digital camera on their phone, their computing device 225, or the like, and sends the digital image to the issuer of the primary verifiable credential, e.g., IDX computing system 200, identity provider 240 or attribute provider 250. In a preferred implementation, this function is enabled by the user's verifiable credential wallet 220. The IDX computing system 200, as the credential issuer is responsible for completing a biometric verification, such as via the biometric liveness check engine 214, using a biometric verification algorithm or Biometric Verification System (BVS). Upon successful BVS verification, the IDX computing system 200, via the verifiable credential engine 216, issues a new short lived verifiable credential to the user's digital wallet 220. This second credential 270 includes the VTID from the primary verifiable credential. This can be used by the verifier and matched against the VTID from the primary verifiable credential. The verifier would then be able to validate the credentials themselves, along with the short lived biometric liveliness assertion from the issuer.

Thus, the illustrative embodiments provide an improved computing tool and improved computing tool operations/ functionality that implements a digital identity exchange (IDX) computing system 200 that interfaces between siloed identity ecosystems and user digital wallets 220 to provide a trusted intermediary for issuing verification credentials 270 and providing verification transaction identifiers (VTIDs) that can be used to quickly notify affected relying parties 230 when a fraud or compromise of a user's identity is detected, either at the IDX computing system 200, the relying party 230, an identity issuer 240, or other verifier of a user's identity, e.g., attribute provider 250. The VTIDs and the IDX computing system's fraud notification engine 218 provides for the broadcasting of affected VTIDs in the case of a breach of a party's computing system, to subscribers to the IDX computing system's fraud notification engine 218. The subscribers may then check their own computing systems to determine if the VTIDS in the broadcast notification 280 are present and if so, take appropriate mitigation actions to prevent fraud or compromise of their protected resources, data, and/or services.

To further illustrate the operation of the IDX computing system 200 in accordance with one illustrative embodiment, consider a scenario in which a user may use this verifiable credential and VTID mechanism of the IDX computing system 200. In a first operation, a bank 232 requests an end-user 227 to provide a verifiable credential, e.g., a passport, driver's license, etc., and complete a biometric liveness check. Using their digital wallet 220, the end-user 227 scans a Quick Response (QR) code the bank generated with the request. The QR represents a verifiable credential presentation invitation and challenge. The user's digital wallet 220 prompts the end-user to collect biometric data of the user, such as by capturing a photograph of their face using the image capture device associated with the user device 225, in this example. The digital wallet 220 requests that the IDX computing system 200 issue a new short lived biometric verifiable credential (VC). The digital wallet 220 sends the biometric sample, e.g., the captured image, and a public cryptographic key (e.g., walletDidKey in the flow diagrams hereafter) which the IDX computing system 200 associates with the verifiable credential to be issued after the IDX computing system 200 has successfully verified the biometric sample.

The IDX computing system 200, in response to receiving the digital credentials 260 with the captured image, communicates with one or more of the identity provider computing system 240 and/or attribute provider computing system 250, whichever is the issuer of the verifiable credential requested by the bank, i.e., the issuer of the user's photo identity document for facial verification. The receiving system 240, 250 performs a facial verification using a facial verification system (FVS), which is a specific type of BVS that is specific to facial recognition, and sends results of the facial verification to the IDX computing system 200.

The IDX computing system 200 signs a short lived verifiable credential 270, having the VTID for the transaction, with a private key which is associated with a public key. The public key has been published to a verifiable data registry (VDR) 290 within a public DID document and is stored at the VDR 290. Verifiable Credential (VC) technology relies heavily on public/private key cryptography. A VC is "verifiable" if a verifier (e.g., relying party or service provider (SP)) can validate the signatures of the VC holder and VC issuer. Verifiers need access to the public keys of the holder and issuer in order to complete cryptographic verification. Issuers of credentials, such as driver's licenses, passports, or other highly trusted documents, will publish their public signing keys in a "well known" location, where this "well known" location is a VDR 290. The VDR 290 is similar to a Domain Name Service (DNS) as it is a foundational, highly trusted, public infrastructure where any entity may publish public key DID documents. A publisher of such DID documents will store the associated private key secure within its own control. When an issuer issues a new VC, it will sign it with the private.

The IDX computing system 200 returns the signed short lived verifiable credential 270 to the digital wallet 220. The end-user consents to share the biometric liveness check credential, selected identity attributes, e.g., driver's license information, or the like, and the VTID of the credentials with the bank 232. The bank 232 stores the VTID issued by the IDX computing system 200 for the verifiable credential 270 and biometric check.

At some point later in time, fraud may occur and be detected through known fraud detection mechanisms which may be provided by the IDX computing system 200, identity provider computing systems 240, attribute provider computing systems 250, or even one or more of the relying parties 230. For example, at some later point in time, the IDX computing system 200 may detect fraud in the system and may publish a notification 280 of the affected VTIDs to all subscribed parties 230 via the fraud notification engine 218. The bank 232, as a subscriber, receives the notification 280 and initiates a search of its locally stored VTID's. If a match is found, the bank 232 can proceed with their fraud mitigation procedures.

As another example, assume that the bank 232 has detected potential fraud in their system. The bank 232 obtains the affected VTIDs issued by the IDX computing system 200, from their local storage of VTIDs, and notifies the IDX computing system 200. For example, the Bank (service provider) records the VTIDs that have been provided to it during a proof presentation as described previously. The Bank (service provider) may send these VTIDs to the IDX computing system 200. The IDX computing system is then able to further resolve and correlate VTIDs associated with the fraud subject. The IDX computing system 200 may then perform a fraud investigation into the end-user 227 in question by analyzing the links to the parties in its system. If the fraud is confirmed, all parties that subscribe to the IDX computing system 200 notification services are notified by the broadcasting of the notification 280 which includes the affected VTIDs.

FIGS. 3A-3F are an authentication credential issuance flow diagram in accordance with one illustrative embodiment. FIGS. 3A-3F illustrate the data and message flows associated with verifiable credential issuance by the IDX computing system 200 to the digital wallets 220. FIGS. 3A-3F also show how the user and the verifier, e.g., a bank 232, present the credential when the verifier needs to establish a trusted identity for the user as a cryptographic proof. The main root of trust is the verifiable data registry and the decentralized identity documents (DID) containing the public cryptographic keys of the IDX computing system 200, as the verifiable credential issuer.

As shown in FIGS. 3A-3F, the main components for the data/message flows are, using similar reference numerals to FIG. 2, the verifier or relying party 230, the user 227, the digital wallet 220, the IDX computing system 200, and the verifiable data registry (VDR) 290. The example shown in FIGS. 3A-3F assumes that the verifier is a commercial or government organization computing device which wants to verify the identity of a user before allowing the user access to protected data, resources, or services. For example, the verifier 230 in this example is considered to be a Bank or other financial institution. The user of the user device 225 is attempting to access an account of that bank. References to "IDX" in the figure are referring to the IDX computing system and stands for "identity exchange". References to "Did" or "DID" are referring to a decentralized identifier (Did), which is a unique identifier, which in the case of verifiable credential issues may be operating on a decentralized database, and which for holders of the verifiable credentials (VCs), are stored "off database", e.g., the holder's digital wallet 220 generates a self-describing DID (did: key) that includes a wallet generated public key. The private key is securely held by the digital wallet 220 and this DID is provided to the issuer as part of the VC issuance request. The issuer then embeds this DID in the VC which is then returned and held in the digital wallet 220. References to "Gov" or "gov" are references to the "government" issued identification. References to "BAC" are referring to biometric authentication credential. References to a "selfie" are references to an image captured by the image capture mechanisms of the user device 225.

As shown in FIGS. 3A-3F, initially the digital identity exchange (IDX) system 200 publishes a public DID document to the verifiable data registry (VDR) 290. Thereafter, a process is followed, comprising operations 2 through 14 through which a user of the user device 225 is issued with a government ID document. The IDX computing system 200 generates a verifiable credential representation of that government ID document. The document is then signed with the IDX computing system's private issuer key. The IDX computing system 200 then binds the signed document to the digital wallet 220 owner. This binding is embodied by assigning the digital wallet's dynamically generated "did: key" DID to the document. This process involves the user device 225 sending a request for a government ID document to the digital wallet 220 (operation 2). The digital wallet 220 sends a message to the IDX computing system 200 to get the public DID document (operation 3). The digital wallet 220 generates a DID key (operation 4) and stores a private key (operation 5). The new DID key, or "did: key", is encrypted with the public key of the IDX computing system 200 (operation 6). The user device 225, via the digital wallet 220, then request the government ID document to be issued and bound to the DID key that was just generated by the digital wallet 220 by sending a request for the government ID issuance specifying the encrypted DID Key to the IDX computing system 200 (operation 7).

The IDX computing system 200 then gets the IDX private key (operation 8) and decrypts the DID key sent by the digital wallet 220 (operation 9). This DID key is then bound to the credential document that is to be created, i.e., through the createGovIdCrednetial (decryptedWalletDidKey) operation (operation 10). The credential document is signed using the private key associated with the public key of the IDX public DID document (operation 11). The response document is then encrypted with the public key supplied by the digital wallet 220 (operation 12) and the response document is returned to the digital wallet 220 (operation 13) which stores the response document (operation 14).

In a subsequent process, assume that a user wants to open a bank account with the bank, i.e. verifier 230. The bank requires that the user supply a verifiable government ID document and government issued verifiable biometric authentication credential (BAC). The BAC expires within a given time period, e.g., 10 minutes. The BAC is signed with the IDX computing system's private issuer key. The IDX computing system binds the BAC to the digital wallet 220 owner, e.g., user of user device 225. This binding is embodied by assigning the digital wallet's dynamically generated DID key, or "did: key", to the government ID document.

As shown in FIGS. 3A-3F, this subsequent process involves operations 15 through 52. Starting with operation 15, this process involves the user device loading the bank website such that the user of the user device 225 may sign up as a new customer of the bank (operation 16). The verifier (bank) 230 then generates a Know Your Client (KYC) Proof document (operation 17). The bank 230 then displays a proof request to the user of the user device 225, such as via a QR code or other mechanism for requesting cryptographic credentials (operation 18). The user device 225 scans the QR code and provides the scan to the digital wallet 220 (operation 19) which sends the scan QR to the bank (operation 20). In operation 19 a QR scan is initiated and in operation 20, the digital wallet 220 decodes the scanned QR code and compares the proof requested credentials with credentials stored in the digital wallet 220. In this example, the digital wallet 220 does not have a valid BAC and thus, it will obtain the BAC from the IDX computing system 200 in "just-in-time" fashion.

Thus, in the next operation, the digital wallet 220 collects biometric data from the user via the user device 225, e.g., through a digital camera or other image capturing device (operation 21). The digital wallet 220 requests the BAC from the IDX system 200 (operation 22). The biometric collected by the digital wallet 220 from the user via the user device 225 must be matchable with biometric data previously registered with the IDX computing system 200. One example would be a "selfie" or other authentication image or biometric input. For purposes of the example of FIGS. 3A-3F, it is assumed that the biometric data collected and stored in the IDX computing system 200 is a "selfie" digital image, i.e., a digital image of the user's facial features for facial recognition purposes, however other images including fingerprints, retina scans, or the like, may also be utilized. In some cases, other types of biometric data that can be used to uniquely identify an individual may also be used, such as voiceprints, gesture analysis, or the like.

In operation 23, the digital wallet sends a get request to the IDX computing system 200 to get the public DID document (operation 23). The digital wallet 220 uses the same DID key as is bound to the government ID document. The digital wallet 220 request the BAC to be issued and bound to that DID key. The digital wallet then, gets the stored government document (operation 24), the stored DID key from the ID document (operation 25, and encrypts the DID Key and Selfie (operation 26). A requestBAC message is then sent from the user device 225 to the IDX computing system 200 (operation 27). The IDX computing system 200 gets the IDX computing system's private key to decrypt the DID key sent by the digital wallet 220 (operations 28-29). The IDX computing system 200 then verifies the selfie sent by the digital wallet 220 with previously verified and stored biometric information stored by the IDX computing system 200 (operation 30).

At this point, the IDX computing system can now issue a BAC. The BAC is assigned a unique verification transaction ID (VTID). The VTID is also used as the BAC credential ID. The BAC is signed using the private key associated with the public key of the IDX public DID document. The resulting encrypted document is stored in the digital wallet 220 (see operations 31-37).

At this point the digital wallet 220 now has the two credentials needed to respond to the bank's KYC proof request. Thus, the digital wallet gets the credentials from its local storage and generates a KYC Proof response and signs it with the private DID key and sends the proof response to the bank 230 (see operations 38-41). The bank then verifies the signature of the proof and credentials using the public DID keys of the IDX issuer and holder of the digital wallet 220, i.e., authorized user of user device 225. This verification may involve operations 42 through 49, for example, where the verifier 230 extracts the credentials from the proof document in the response sent from the IDX computing system 200 (operation 42), gets the digital wallet DID key from the government ID credential (operations 43-44), verifies the proof document's signature using the wallet DID key (operation 45), verifies the issuer signature using the IDX public DID key and government ID credential (operation 46), obtains the wallet DID key from the BAC (operation 47), verifies the proof document signature based on the wallet DID key and BAC (operation 48), and verifies the issuer's signature based on the IDX public DID key and the BAC (operation 49).

At this point, the bank has verified the user and can now open an account for the user and record the BAC id as KYC evidence. Thus, the bank 230 stores the BAC ID (operation 50) and opens an account for the user (operation 51). The user is then presented with the account portal via the bank's website and the user's user device 225 (operation 52).

Figure 4:
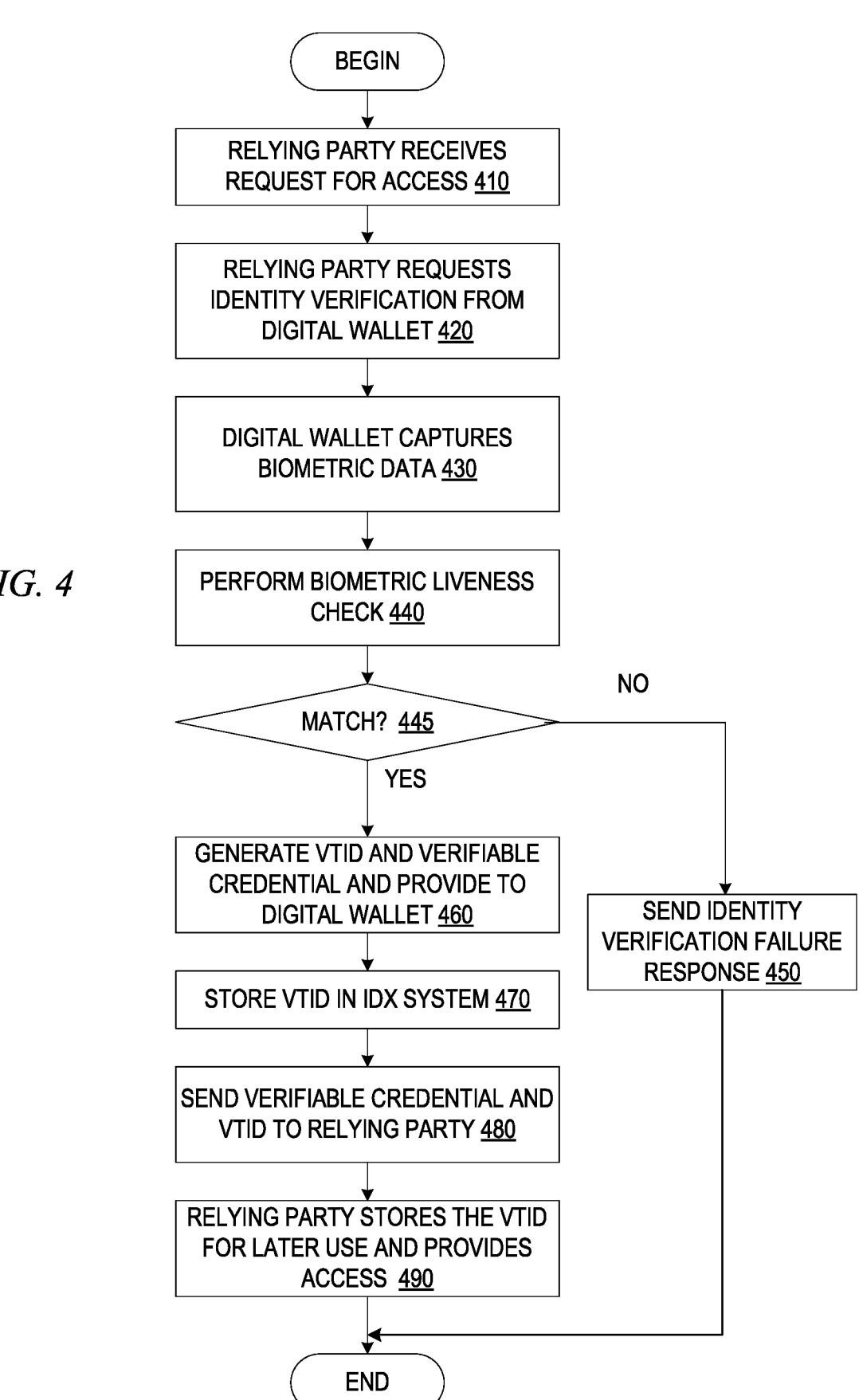
FIG. 4 is a flowchart outlining an example operation of an IDX computing system in accordance with one illustrative embodiment.
Figure 5:
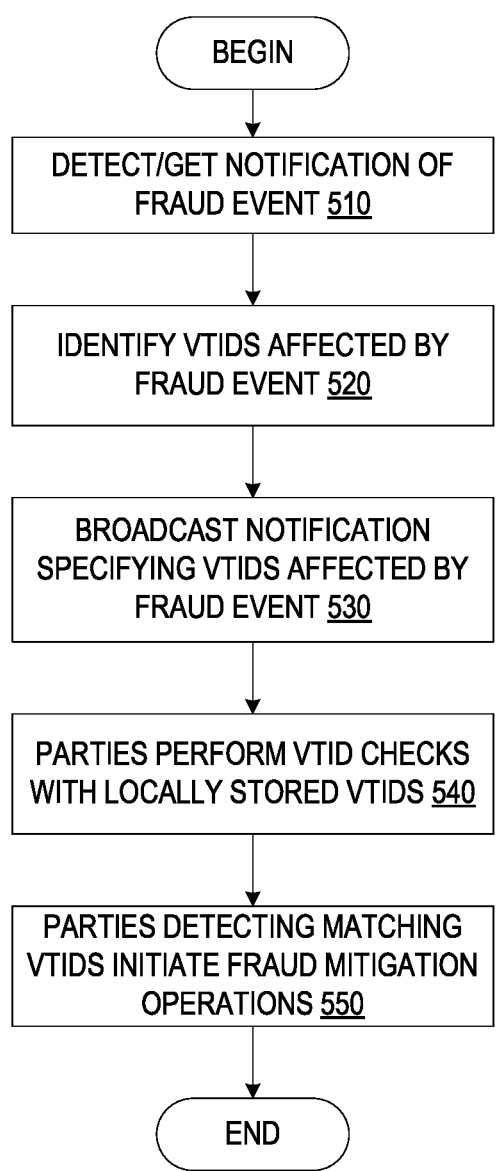
FIG. 5 is a flowchart outlining an example operation of an IDX computing system with regard to broadcasting verification transaction IDs in response to detected fraud in accordance with one illustrative embodiment.

FIGS. 4-5 present flowcharts outlining example operations of elements of the present invention with regard to one or more illustrative embodiments. It should be appreciated that the operations outlined in FIGS. 4-5 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIGS. 4-5, and may, in some cases, make use of the results generated as a consequence of the operations set forth in FIGS. 4-5, the operations in FIGS. 4-5 themselves are specifically performed by the improved computing tool in an automated manner.

FIG. 4 is a flowchart outlining an example operation of an IDX computing system with regard to verification of an identity in accordance with one illustrative embodiment. It is assumed for purposes of this example operation that the user has previously registered with one or more identity or attribute providers who have issued an identifier for the user, e.g., a government ID document or other identification document. Moreover, in this process, or a separate process with the digital identity exchange (IDX) computing system 200 itself, the user has provided verified biometric data of the user against which subsequent requests may be compared.

As shown in FIG. 4, the operation starts with a user of a user computing device requesting access to protected data, resources, or services of a relying party, also referred to herein as a verifier as they are the ones attempting to verify the identity of the user (step 410). The relying party requests an identity verification of the user from the user's digital wallet (step 420). This may include, for example, sending a QR code or other digital request which may be processed and used by the user's digital wallet 220 to collect biometric data and send it for verification (step 430). For example, the user's computing device may scan the QR code and recognize the QR code as a BAC request and initiate facial image capturing operations on the user device to capture a current facial image of the user for comparison with previously stored facial image data.

The biometric data sent to the IDX computing system is then used to perform a biometric liveness check (step 440). This may involve the IDX computing system interacting with the identity or attribute provider computing systems 240, 250 to utilize their BVS to perform a facial image comparison and verify that the currently provided facial image matches substantially the stored facial image data. In some cases the IDX computing system 200 itself may have a BVS for this purpose and may store facial image data locally for use in perform BVS based verification.

If the biometric liveness check results in the biometric data not matching (step 445), then an identity verification failure response may be sent back to the digital wallet 220 (step 450). If the biometric liveness check results in the biometric data matching, then a verification transaction ID (VTID) is generated for this transaction and provided to the digital wallet along with a verifiable credential indicating that the user has been verified (step 460). The VTID is also stored locally at the IDX computing system (step 470). The digital wallet may then send the verifiable credential and VTID to the relying party computing system for verifying the user (step 480). The relying party computing system stores the VTID for later use in performing fraud mitigation operations should a fraud be detected, and provides access to the protected data, resources, or services provided by the relying party (step 490). The operation then terminates.

FIG. 5 is a flowchart outlining an example operation of an IDX computing system with regard to broadcasting verification transaction IDs in response to detected fraud in accordance with one illustrative embodiment. As shown in FIG. 5, the operation starts by the IDX computing system detecting a fraud event or receiving a notification of a fraud event from another computing device (step 510). The IDX system 200 identifies, from the fraud detection or fraud event notification, which VTIDs are affected by the fraud event (step 520). The IDX computing system then sends out a broadcast to all subscribed relying parties and/or identity/attribute providers, to notify them of which VTIDs are affected by the fraud event (step 530). The relying parties and/or identity/attribute providers perform checks of their locally stored VTIDs to determine if any matches are identified between the affected VTIDs in the broadcast notification, and the VTIDs stored locally (step 540). If matches are identified, then fraud mitigation operations are initiated at the affected parties or identity/attribute providers (step 550). The operation then terminates.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system specifically configured to provide a decentralized digital identity exchange (IDX), the method comprising:

receiving, from a relying party computing system, a request for identity verification of a user requesting access to one of data, resources, or services of the relying party;

transmitting, by the IDX of the data processing system, to a digital wallet associated with the user, a request for current biometric data of the user;

receiving, from the digital wallet, the current biometric data;

performing a biometric liveness check on the current biometric data based on previously stored biometric data;

in response to the biometric liveness check indicating the current biometric data matches the previous stored biometric data, generating a verification transaction ID (VTID) and a verifiable credential for the user, wherein the VTID is a unique identifier that comprises a representation of when the identity of the user was verified by the IDX;

transmitting the verifiable credential and VTID to the digital wallet, wherein the digital wallet sends the verifiable credential and VTID to the relying party computing system to verify the identity of the user to the relying party computing system, thereby causing access to one of the data, the resources, or the services of the relying party;

receiving, by the IDX, a fraud event notification from an identity credential issuing organization computing system;

identifying, by the IDX, based on the fraud event notification, one or more VTIDs affected by the fraud event based on a correlation index of an identification, in the fraud event notification, of identity credentials affected by the fraud event with previously generated VTIDs generated by the IDX; and causing mitigation actions to be performed against accessing one of the data, the resources, or the services of the relying party by broadcasting a notification to a plurality of relying party computing systems, the notification of the fraud event specifying the one or more VTIDs affected by the fraud event.

2. The method of claim 1, wherein the plurality of relying party computing systems check local systems for a presence of the one or more VTIDS affected by the fraud event, and in response to a first relying party computing system, in the plurality of relying party computing systems, finding at least one of the one or more VTIDs affected by the fraud event in a first local system, the first relying party computing system performs one or more fraud mitigation operations.

3. The method of claim 1, wherein the IDX maintains a mapping, for each siloed identity source computing systems in a plurality of siloed identity source computing systems, of an identity of the siloed identity source computing system and VTIDs generated for transactions associated with the requests for identity verification targeting the siloed identity source computing system, and wherein each siloed identity source computing system maintains their own identity verification mechanism separate from other siloed identity source computing systems, in the plurality of siloed identity source computing systems, without a federated identity system.

4. The method of claim 3, wherein each of the plurality of siloed identity source computing systems are service providers that require verification of identity of users prior to providing services to the users.

5. The method of claim 3, wherein the plurality of siloed identity source computing systems comprise at least one of commercial organization computing systems, or government organization computing systems, which issue identity credentials to users.

6. The method of claim 3, wherein the plurality of siloed identity source computing systems comprise a driver's license issuing organization computing system or a passport issuing organization computing system.

7. The method of claim 1, wherein the current biometric data comprises an image of the user captured by an image capture device associated with the digital wallet in response to the digital wallet receiving the request for current biometric data of the user.

8. The method of claim 1, wherein the biometric liveness check on the current biometric data based on previously stored biometric data is performed by a biometric verification system (BVS) implemented at an identity provider computing system separate from the IDX and results of the biometric liveness check are provided to the IDX.

9. The method of claim 1, wherein the request for identity verification of a user from the relying party comprises a machine only readable code which is scanned by the digital wallet and causes the digital wallet to automatically initiate a verification process of the IDX comprising the transmitting the request for current biometric data of the user, receiving the current biometric data, performing a biometric liveness check, generating a VTID and a verifiable credential for the user, and transmitting the verifiable credential and VTID to the digital wallet.

10. A computer program product comprising a computer readable storage medium having a computer readable program stored therein, wherein the computer readable program, when executed on a computing device, causes the computing device to be specifically configured to provide a decentralized digital identity exchange (IDX) that operates to execute computer-implemented operations comprising:

receiving, from a relying party computing system, a request for identity verification of a user requesting access to one of data, resources, or services of the relying party;

transmitting, by the IDX of the data processing system, to a digital wallet associated with the user, a request for current biometric data of the user;

receiving, from the digital wallet, the current biometric data;

performing a biometric liveness check on the current biometric data based on previously stored biometric data;

in response to the biometric liveness check indicating the current biometric data matches the previous stored biometric data, generating a verification transaction ID (VTID) and a verifiable credential for the user, wherein the VTID is a unique identifier that comprises a representation of when the identity of the user was verified by the IDX;

transmitting the verifiable credential and VTID to the digital wallet, wherein the digital wallet sends the verifiable credential and VTID to the relying party computing system to verify the identity of the user to the relying party computing system;

receiving, by the IDX, a fraud event notification from an identity credential issuing organization computing system;

identifying, by the IDX, based on the fraud event notification, one or more VTIDs affected by the fraud event based on a correlation index of an identification, in the fraud event notification, of identity credentials affected by the fraud event with previously generated VTIDs generated by the IDX; and causing mitigation actions to be performed against accessing one of the data, the resources, or the services of the relying party by broadcasting a notification to a plurality of relying party computing systems, the notification of the fraud event specifying the one or more VTIDs affected by the fraud event.

11. The computer program product of claim 10, wherein the plurality of relying party computing systems check local systems for a presence of the one or more VTIDS affected by the fraud event, and in response to a first relying party computing system, in the plurality of relying party computing systems, finding at least one of the one or more VTIDs affected by the fraud event in a first local system, the first relying party computing system performs one or more fraud mitigation operations.

12. The computer program product of claim 10, wherein the IDX maintains a mapping, for each siloed identity source computing systems in a plurality of siloed identity source computing systems, of an identity of the siloed identity source computing system and VTIDs generated for transactions associated with the requests for identity verification targeting the siloed identity source computing system, and wherein each siloed identity source computing system maintains their own identity verification mechanism separate from other siloed identity source computing systems, in the plurality of siloed identity source computing systems, without a federated identity system.

13. The computer program product of claim 12, wherein each of the plurality of siloed identity source computing systems are service providers that require verification of identity of users prior to providing services to the users.

14. The computer program product of claim 12, wherein the plurality of siloed identity source computing systems comprise at least one of commercial organization computing systems, or government organization computing systems, which issue identity credentials to users.

15. The computer program product of claim 12, wherein the plurality of siloed identity source computing systems comprise a driver's license issuing organization computing system or a passport issuing organization computing system.

16. The computer program product of claim 10, wherein the current biometric data comprises an image of the user captured by an image capture device associated with the digital wallet in response to the digital wallet receiving the request for current biometric data of the user.

17. The computer program product of claim 10, wherein the biometric liveness check on the current biometric data based on previously stored biometric data is performed by a biometric verification system (BVS) implemented at an identity provider computing system separate from the IDX and results of the biometric liveness check are provided to the IDX.

18. An apparatus comprising:

at least one processor; and at least one memory coupled to the at least one processor, wherein the at least one memory comprises instructions which, when executed by the at least one processor, cause the at least one processor to be specifically configured to provide a decentralized digital identity exchange (IDX) that operates to execute computer-implemented operations comprising:

receiving, from a relying party computing system, a request for identity verification of a user requesting access to one of data, resources, or services of the relying party;

transmitting, by the IDX of the data processing system, to a digital wallet associated with the user, a request for current biometric data of the user;

receiving, from the digital wallet, the current biometric data;

performing a biometric liveness check on the current biometric data based on previously stored biometric data;

in response to the biometric liveness check indicating the current biometric data matches the previous stored biometric data, generating a verification transaction ID (VTID) and a verifiable credential for the user, wherein the VTID is a unique identifier that comprises a representation of when the identity of the user was verified by the IDX;

transmitting the verifiable credential and VTID to the digital wallet, wherein the digital wallet sends the verifiable credential and VTID to the relying party computing system to verify the identity of the user to the relying party computing system;

receiving, by the IDX, a fraud event notification from an identity credential issuing organization computing system;

identifying, by the IDX, based on the fraud event notification, one or more VTIDs affected by the fraud event based on a correlation index of an identification, in the fraud event notification, of identity credentials affected by the fraud event with previously generated VTIDs generated by the IDX; and causing mitigation actions to be performed against accessing one of the data, the resources, or the services of the relying party by broadcasting a notification to a plurality of relying party computing systems, the notification of the fraud event specifying the one or more VTIDs affected by the fraud event.

\* \* \* \* \*